US011915350B2

(12) United States Patent
Guo et al.

(10) Patent No.: US 11,915,350 B2
(45) Date of Patent: Feb. 27, 2024

(54) TRAINING ONE-SHOT INSTANCE SEGMENTERS USING SYNTHESIZED IMAGES

(71) Applicant: Intel Corporation, Santa Clara, CA (US)

(72) Inventors: Ping Guo, Beijing (CN); Wei Hu, Beijing (CN); Yimin Zhang, Beijing (CN); Renjing Pei, Wuhan (CN)

(73) Assignee: INTEL CORPORATION, Santa Clara, CA (US)

( * ) Notice: Subject to any disclaimer, the term of this patent is extended or adjusted under 35 U.S.C. 154(b) by 389 days.

(21) Appl. No.: 16/972,931

(22) PCT Filed: Aug. 29, 2018

(86) PCT No.: PCT/CN2018/102927
§ 371 (c)(1),
(2) Date: Dec. 7, 2020

(87) PCT Pub. No.: WO2020/042004
PCT Pub. Date: Mar. 5, 2020

(65) Prior Publication Data
US 2021/0248418 A1    Aug. 12, 2021

(51) Int. Cl.
*G06F 18/214* (2023.01)
*G06T 5/50* (2006.01)
(Continued)

(52) U.S. Cl.
CPC .......... *G06T 11/60* (2013.01); *G06F 18/2148* (2023.01); *G06T 5/50* (2013.01);
(Continued)

(58) Field of Classification Search
CPC ......... G06F 18/2148; G06T 5/50; G06T 7/11; G06T 7/194; G06T 11/40; G06T 11/60; G06T 2207/20221
See application file for complete search history.

(56) References Cited

U.S. PATENT DOCUMENTS 10,049,308 B1 *   8/2018  Dhua ...................... G06T 11/60
10,127,631 B1 *  11/2018  Duan ...................... G06T 11/60
(Continued)

FOREIGN PATENT DOCUMENTS

CN       106023275 A     10/2016
CN       106339997 A      1/2017
(Continued)

OTHER PUBLICATIONS

Khalil et al. ("Synthetic training in object detection," IEEE International Conference on Image Processing; Date of Conference: Sep. 15-18, 2013) (Year: 2013).*

(Continued)

*Primary Examiner* — Yubin Hung
(74) *Attorney, Agent, or Firm* — Hanley, Flight & Zimmerman, LLC (57) ABSTRACT

An example apparatus for generating synthesized images includes a receiver to receive a frame, a mask and external images. The apparatus also includes a foreground augmenter to generate augmented foregrounds in the frame based on the mask. The apparatus includes a background augmenter to generate augmented backgrounds based on the frame, the mask, and the external images. The apparatus also further includes an image synthesizer to generate a synthesized image based on the generated augmented foregrounds and the augmented backgrounds.

25 Claims, 7 Drawing Sheets

(51) Int. Cl.
*G06T 7/194* (2017.01)
*G06T 11/40* (2006.01)
*G06T 11/60* (2006.01)

(52) U.S. Cl.
CPC .............. *G06T 7/194* (2017.01); *G06T 11/40* (2013.01); *G06T 2207/20221* (2013.01)

(56) References Cited

U.S. PATENT DOCUMENTS

| | | | |
|---|---|---|---|
| 10,234,380 B1* | 3/2019 | Wang | G01N 21/3504 |
| 2004/0077393 A1 | 4/2004 | Kim et al. | |
| 2007/0286482 A1* | 12/2007 | Au | G08B 13/1961 |
| | | | 382/173 |
| 2012/0288186 A1* | 11/2012 | Kohli | G06V 10/772 |
| | | | 382/159 |
| 2015/0086112 A1* | 3/2015 | Tian | G06V 10/28 |
| | | | 382/173 |
| 2015/0091900 A1* | 4/2015 | Yang | G06V 40/162 |
| | | | 345/419 |
| 2018/0189951 A1* | 7/2018 | Liston | G06T 7/194 |
| 2018/0268527 A1* | 9/2018 | Schroers | G06V 10/273 |
| 2019/0130218 A1* | 5/2019 | Albright | G06V 10/772 |
| 2019/0311202 A1* | 10/2019 | Lee | G06T 9/002 |

FOREIGN PATENT DOCUMENTS

| | | |
|---|---|---|
| CN | 107169973 A | 9/2017 |
| WO | 2015071526 A1 | 5/2015 |
| WO | 2020042004 A1 | 3/2020 |
| WO | 2020102927 A1 | 5/2020 |

OTHER PUBLICATIONS

Huang et al. ("Foreground-distortion method for image synthesis," Ninth International Conference on Computer Aided Design and Computer Graphics; Date of Conference: Dec. 7-10, 2005) (Year: 2005).*

Dwibedi et al. ("Cut, Paste and Learn: Surprisingly Easy Synthesis for Instance Detection," IEEE International Conference on Computer Vision; Date of Conference: Oct. 22-29, 2017) (Year: 2017).*

Chou et al. ("Stingray Detection of Aerial Images Using Augmented Training Images Generated by A Conditional Generative Model," arXiv:1805.04262v3, Jun. 25, 2018) (Year: 2018).*

Pezeshk et al. ("Seamless Lesion Insertion for Data Augmentation in CAD Training," IEEE Transactions on Medical Imaging; vol. 36, Issue: 4, Apr. 2017) (Year: 2017).*

Everingham et al., "The PASCAL Visual Object Classes Challenge: A Retrospective, " International Journal of Computer Vision, Jun. 2014, vol. 111, pp. 98-136.

Patent Cooperation Treaty, "Written Opinion," issued in connection with PCT Appl. No. PCT/CN2018/102927, dated Jun. 4, 2019, 3 pages.

Patent Cooperation Treaty, "International Search Report," issued in connection with PCT Appl. No. PCT/CN2018/102927, dated Jun. 4, 2019, 3 pages.

Patent Cooperation Treaty, "International Preliminary Report on Patentability," issued in connection with PCT Appl. No. PCT/CN2018/102927, dated Mar. 2, 2021, 4 pages.

Pont-Tuset et al., "The 2017 DAVIS Challenge on Video Object Segmentation," CVPR Workshops, Mar. 2018, 6 pages.

Caelles et al., "OSVOS: One-Shot Video Object Segmentation State-of-the-Art Results in Accuracy and Speed," Computer Vision and Pattern Recognition (CVPR), 2017, 10 pages.

Newswanger et al., "One-Shot Video Object Segmentation with Iterative Online Fine-Tuning," CVPR 2017 Workshops, 2017, 5 pages.

Chen et al., "DeepLab: Semantic Image Segmentation with Deep Convolutional Nets, Atrous Convolution, and Fully Connected CRFs," IEEE Transactions on Pattern Analysis and Machine Intelligence, Apr. 2017, vol. 40, No. 4, pp. 834-848.

Li et al., "Video Object Segmentation with Re-identification," CVPR Workshops, Aug. 2017, 6 pages.

Khoreva et al., "Lucid Data Dreaming for Object Tracking," CVPR 2017 Workshops, Mar. 2017, 6 pages.

Yang et al., "High-Resolution Image Inpainting using Multi-Scale Neural Patch Synthesis," Computer Vision and Pattern Recognition, Nov. 2016, 9 pages.

Rodgers et al., "Thirteen Ways to Look at the Correlation Coefficient," The American Statistician, Feb. 1988, vol. 42, No. 1, pp. 59-66.

Perez et al., "Poisson image editing," ACM Transactions on Graphics (TOG), Jul. 2003, vol. 22, No. 3, pp. 313-318.

* cited by examiner

TRAINING ONE-SHOT INSTANCE SEGMENTERS USING SYNTHESIZED IMAGES

RELATED APPLICATIONS

This patent claims priority to International PCT Application No. PCT/CN2018/102927, which was filed on Aug. 29, 2018, and which is hereby incorporated herein by reference in its entirety.

BACKGROUND

One-shot instance segmenters may be used to densely segment out the foreground object instance from a background in an image. Moreover, one-shot instance segmenters can segment images given only one frame mask of the required object(s). For example, the frame mask may correspond to an object to be segmented from a background in an image.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As discussed above, one-shot instance segmenters may be used to densely segment out the foreground object instance from a background in an image. One-shot instance segmenters can be trained using two training stages including an offline training and an online training. In the offline training stage, a general segmentation model can be trained. For example, the segmentation model may be a deep convolutional neural network (DCNN) such as DeepLab (released May 2017 by Chen et al.). In the online training stage, the classifier may then be fined tuned on a given single ground truth frame. However, the performance of networks trained in such a manner may degrade greatly as the background changes dramatically. For one-shot instance segmentation, both the foreground and background contents may change greatly from the annotated image. As used herein, annotation refers to labeling of data. The foreground object may change its shape, orientation, size etc. Moreover, changes in background contents may be even harder to predict. For example, a dog running out from indoors to outdoors may be very difficult to predict. In particular, new content occurring in the test image, and not in the annotated frame used to train the segmenter, may significantly degrade segmentation performance. Thus, training a model based on only a first frame may not be sufficient to handle large background changes.

The present disclosure relates generally to techniques for synthesizing training images. Specifically, the techniques described herein include an apparatus, method and system for synthesizing training images to be used for training one-shot instance segmenters. An example apparatus includes a receiver to receive a frame, a mask and external images. The apparatus includes a foreground augmenter to generate augmented foregrounds in the frame based on the mask. The apparatus further includes a background augmenter to generate augmented backgrounds based on the frame, the mask, and the external images. The apparatus also includes an image synthesizer to generate a synthesized image based on the augmented foregrounds and the augmented backgrounds. In some examples, the apparatus further includes a segmenter trainer to train a one-shot instance segmenter based on the synthesized image.

The techniques described herein thus enable the training of one-shot instance segmenters based on a single frame and mask and an external set of images that do not need to be annotated. Moreover, the techniques may be used to train a one-shot instance segmenter to segment a specific instance with no prior knowledge about its semantic category. In addition, because only a small number of augmented background images are enough to synthesize additional training sets, the techniques may not require a long time to train. The techniques achieve much better results in terms of both precision and recall. As used herein, recall indicates ability to obtain more complete foregrounds. The techniques may result in better detail, less noise, and less mistakes in the backgrounds of images segmented using one-shot instance segmenters trained with the synthesized training images.

In some examples, the techniques can be used to detect objects that a general nets trained on large datasets may fail to recognize. In addition, the techniques can be used to recognize a specific instance but not a general object category. For example, the techniques may be used to recognize an owner's hat, and not just any hat. As one example, to achieve this goal, a user can show a robot once of what the hat looks like, then the robot should recognize the specific hat by using the techniques described herein. Moreover, the techniques can be used for segmentation of both video frames as well as still photos.

Figure 1:
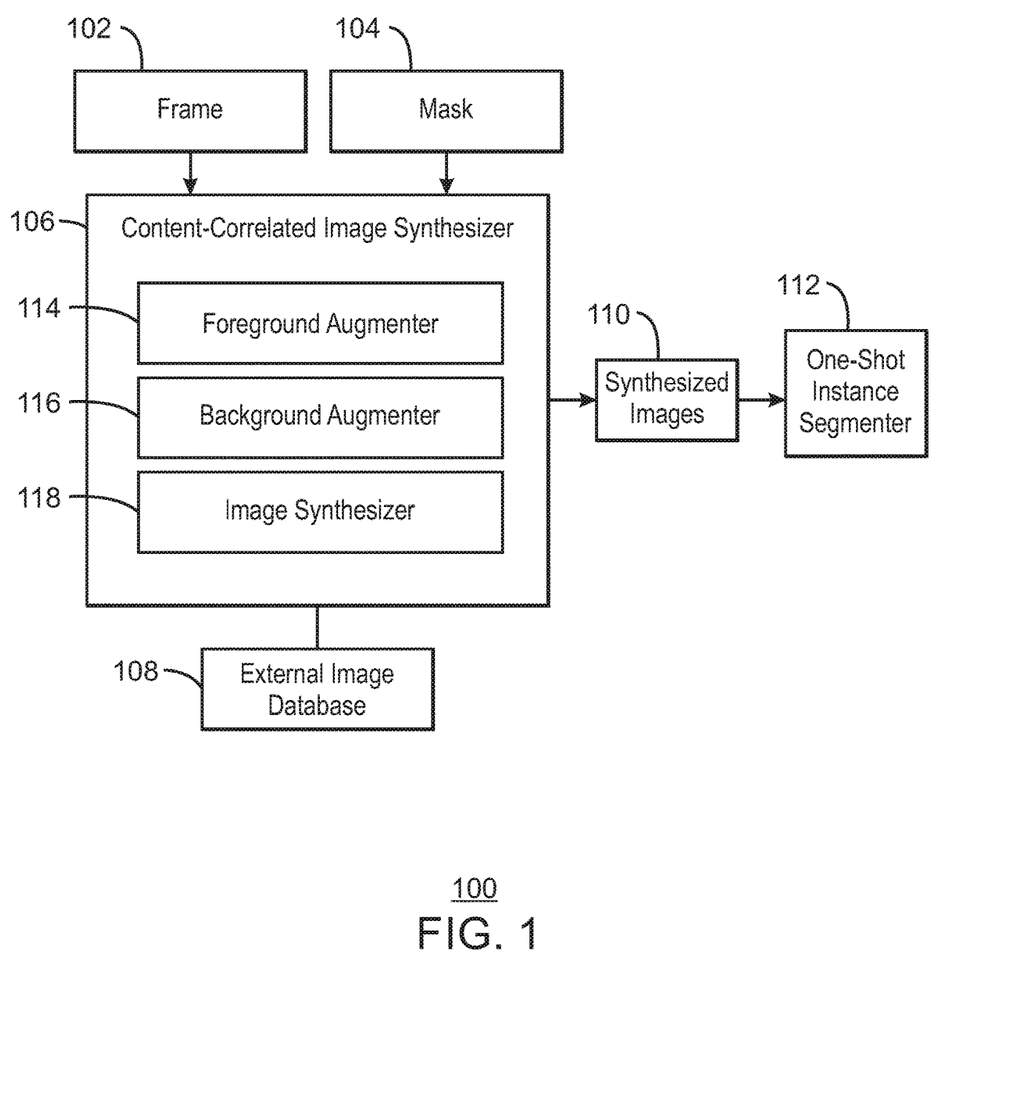
FIG. 1 is a block diagram illustrating an example system for training a one-shot instance segmenter using synthesized images.

FIG. 1 is a block diagram illustrating an example system for training a one-shot instance segmenter using synthesized images. The example system is referred to generally by the reference number 100 and can be implemented in the computing device 600 below in FIG. 6 using the methods 300-500 of FIGS. 3-5 below.

The example system 100 includes a frame 102 and a mask 104. The system 100 includes a content-correlated image synthesizer 106 shown receiving the frame and the mask. The content-correlated image synthesizer 106 is communicatively coupled to an external image database 108. The content-correlated image synthesizer 106 is shown generated training images 110 and is communicatively coupled to a one-shot instance segmenter 112. The content-correlated image synthesizer 106 includes a foreground augmenter 114, a background augmenter 116, and an image synthesizer 118.

As shown in FIG. 1, a content-correlated image synthesizer 106 can be used to generate training images 110 from a frame 102, a mask 104, and a number of external images in an external image database 108. For example, the external image database 108 may be any available database of images used for training neural networks. The training images 110 may be a small set of training example images, used to train a one-shot instance segmenter 112 in an online fine-tuning stage. For example, the one-shot instance segmenter 112 can be trained iteratively. In one example, the number of iterations may be 2000 times.

In particular, given a first video frame 102 with corresponding foreground mask(s) 104, the foreground augmenter can first separate the foreground from the background. The foreground and background can then be augmented separately, via the foreground augmenter 114 and the background augmenter 116, respectively. The augmented foregrounds and augmented backgrounds can then be combined to form synthesized images 110. In general, the synthesized images can be used in training to prepare a one-shot instance segmenter 112 for the various scenes changes in the subsequent frames. For example, the scene changes may include diversity in the varieties of the backgrounds and rigid and non-rigid variations of the foreground objects. As described in greater detail below, the background augmenter 116 may use a predetermined number of images from an external image database 108 to generate some of the augmented backgrounds.

The diagram of FIG. 1 is not intended to indicate that the example system 100 is to include all of the components shown in FIG. 1. Rather, the example system 100 can be implemented using fewer or additional components not illustrated in FIG. 1 (e.g., additional frames, masks, databases, segmenters, etc.).

Figure 2:
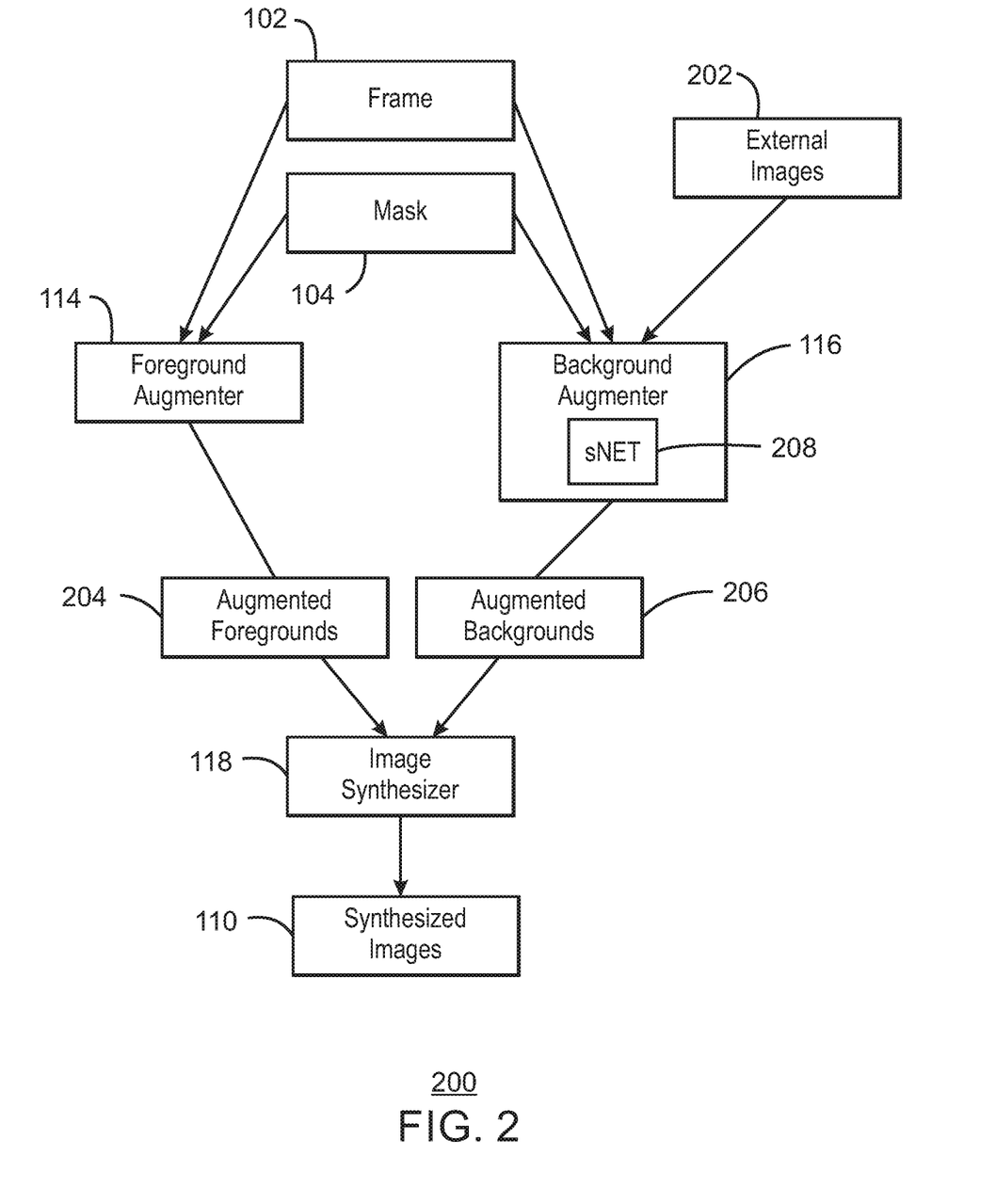
FIG. 2 is a block diagram illustrating an example system for synthesizing images that are content-correlated.

FIG. 2 is a block diagram illustrating an example system for synthesizing images that are content-correlated. The example system is referred to generally by the reference number 200 and can be implemented in the computing device 600 below in FIG. 6 using the methods 300-500 of FIGS. 3-5 below.

The example system 200 includes similarly numbered elements from FIG. 1 above. For example, the system includes a frame 102 and a mask, shown being input into a foreground augmenter 112 and a background augmenter 116. The system 200 also includes an image synthesizer shown generating synthesized images 110. The system 200 further includes a set of external images 202 shown being input into the background augmenter 116. The system 200 also further includes augmented foregrounds 204 and augmented backgrounds 206. For example, the augmented foregrounds 204 may be foreground diversifications that are generated by the foreground augmenter. The augmented backgrounds 206 may include a first frame background and a number of color and semantic-correlated backgrounds. The background augmenter 116 further includes a semantic segmentation network (sNet) 208. For example, the sNet may be the DeepLab convolutional neural network.

As shown in FIG. 2, a set of synthesized images 110 can be generated based on a frame 102 a mask 104, and external images 202. The foreground augmenter 114 may perform foreground augmentation by applying rigid and non-rigid transformations to a foreground extracted from the frame 102 based on the mask 104. For example, the rigid transformations can include resizing, translation, and rotation. The non-rigid transformations can include applying a simple 2D thin-plate splines. In some examples, any accurate non-rigid transformation techniques can be applied, including both the 3D model based methods and non-model based methods. For each received annotated foreground, the foreground augmenter can generate a predetermined number M augmented foregrounds, each with a randomly different resize scale, translation position, and rotation angle. For example, the system 200 may receive a mask 104 having an annotated foreground for each instance of object in a frame corresponding to the mask. In some examples, the predetermined number of augmented foregrounds may be M=10.

The background augmenter 116 can generate augmented backgrounds 206 including a first frame background (FFB) restored from the first frame 102, and Color and Semantic—correlated Background (CSB) retrieved and restored from external images 202. Since the background changes may be hard to predict, the FFB may be used to preserve content continuity, and the CSB may be used to provide diversity of content for training. In order to balance each background type, the background augmenter 116 can generate a predetermined total of 2N background samples, including N CSBs and N copies of the FFB. As one example, the predetermined number N can be set to 25. In particular, using 25 CSB samples may result in a significant increase of the intersection over union mean measure of accuracy of detection.

In some examples, the background augmenter 206 can generate CSBs based on external images 202 retrieved from an external database based on a calculated correlation score. For example, the database can be the VOC2012 dataset from the Visual Object Classes Challenge (released in 2012 by the PASCAL Visual Object Classes Project), or any other suitable dataset containing images. For example, from the external database, the background augmenter 206 can select a top N external images 202 by calculating a correlation score P for each of the external images 202 with the given first frame 102. The correlation score P may be a weighted sum of the foreground semantic correlation score S, plus the color histogram correlation score C and the background purity score B, and can be calculated using the equation:

$$P = C + \alpha \cdot S + \beta \cdot B \qquad \text{Eq. 1}$$

where the color histogram correlation score C describes two images' color histogram similarity and $\alpha$ and $\beta$ are weights. In some examples, background augmenter 206 can use a cosine similarity of the two color histogram vectors, $V_{ch}(1)$ and $V_{ch}(2)$ to calculate the value of the color histogram correlation score C using the equation:

$$C = \frac{V_{ch}(1) \cdot V_{ch}(2)}{\|V_{ch}(1)\| \|V_{ch}(2)\|} \qquad \text{Eq. 2}$$

In some examples, the background augmenter 206 can use the following approach to calculate the image's color histogram $V_{ch}$. For each RGB channel, the background augmenter 206 can use four evenly sized bins to reduce the values from 256 for each channel to four bins for each channel. For example, the values 0-63 for a color may be stored in a first bin, the values 64-127 for the second bin, the values 128-191 in a third bin, and the values 192-255 in a fourth bin for each of the color channels. Since a color is a combination of red (R), green (G), and blue (B), the total number of colors may be the combination of different R, G, and B. Thus, there may be a total of 64 bins ($4^3$), indicating a total of 64 different colors.

The background augmenter 206 can calculate a semantic correlation score S to measure the semantic similarity of two images. Empirically, foreground contents may be correlated with backgrounds. For example, a person with a bicycle as a foreground may be more likely to appear on roads than on rivers as a background. Thus, two images with the same semantic category of foregrounds may be more likely to contain similar backgrounds. In some examples, the sNet 208 can be trained on any suitable external database. For example, the external database may be used to train the DeepLab DCNN as the sNet. The input of the sNet is an RGB image, and the output is a semantic map. For example, the semantic map may have the same size as the input, with pixel values representing the semantic category of each pixel. The total number of semantic categories used may depend on the external database. For example, a total number of 20 semantic categories are used in the VOC2012 dataset. Thus, both the first video frame 102 and the external images 202 in the external database may be passed through the sNet to obtain semantic maps. The output semantic map of the sNet may have each pixel value indicating its semantic label. For example, the background augmenter 206 use the VOC2012 dataset to train the sNet with 21 classes. The output of sNet may be a map with pixel values of 0 to 20, where 0 indicates background and 1-20 indicate various foregrounds. In some examples, the background augmenter 206 can first find the semantic labels that occur on both the first frame semantic map and the external image semantic map. Then the background augmenter 206 can denote these labels as L={$l_1, l_2, \ldots l_K$} where K is the number of the both occurred labels. For each $l_i$ (i=1, . . . , K) on the external image semantic map, the background augmenter 206 can compute the ratio of its pixels with the total number of foreground pixels, denoted as $O_k$. A semantic correlation score S can then be calculated using the equation:

$$S = \begin{cases} \sum_{k=1}^{K} O_k & \text{, if } K > 0 \\ 0 & \text{, else} \end{cases} \quad \text{Eq. 3}$$

The background augmenter 206 can receive a background purity B. Since the CSB is for background augmentation, background augmenter 206 can use the background purity B to select images that contains small areas of foregrounds rather than large areas of foregrounds. The background purity B is defined as the ratio of background area to the total number of image pixels. The weight factors of α and β can be decided experimentally. For example, the weights can be preset at α=2 and β=0.1.

In some examples, after selecting the top N images according to the score P in descending order, the background augmenter 206 can remove the foregrounds in the same semantic category with the foreground in the first frame 102. Then, the background augmenter 206 can use an image inpainting technique to restore the background in the removed portion and generate a CSB image. For example, the background augmenter 206 can use the High-Resolution Image Painting using Multi-Scale Neural Patch Synthesis (released April 2017 by Yang et al.).

The image synthesizer 118 can combine the 2N augmented backgrounds 206 with various combinations of the augmented foreground 204. In some examples, the image synthesizer 118 can use Poisson matting to smooth the gradients between foreground and background. The final augmented image dataset contains 2N*M samples, which is all the possible combinations of the M foregrounds and 2N backgrounds. For example, given 10 augmented foregrounds 204 and 50 augmented backgrounds 206 a total of 50*10=500 synthesized images 110 can be generated by the image synthesizer.

The diagram of FIG. 2 is not intended to indicate that the example system 200 is to include all of the components shown in FIG. 2. Rather, the example system 200 can be implemented using fewer or additional components not illustrated in FIG. 2 (e.g., additional frames, masks, synthesizers, etc.).

Figure 3:
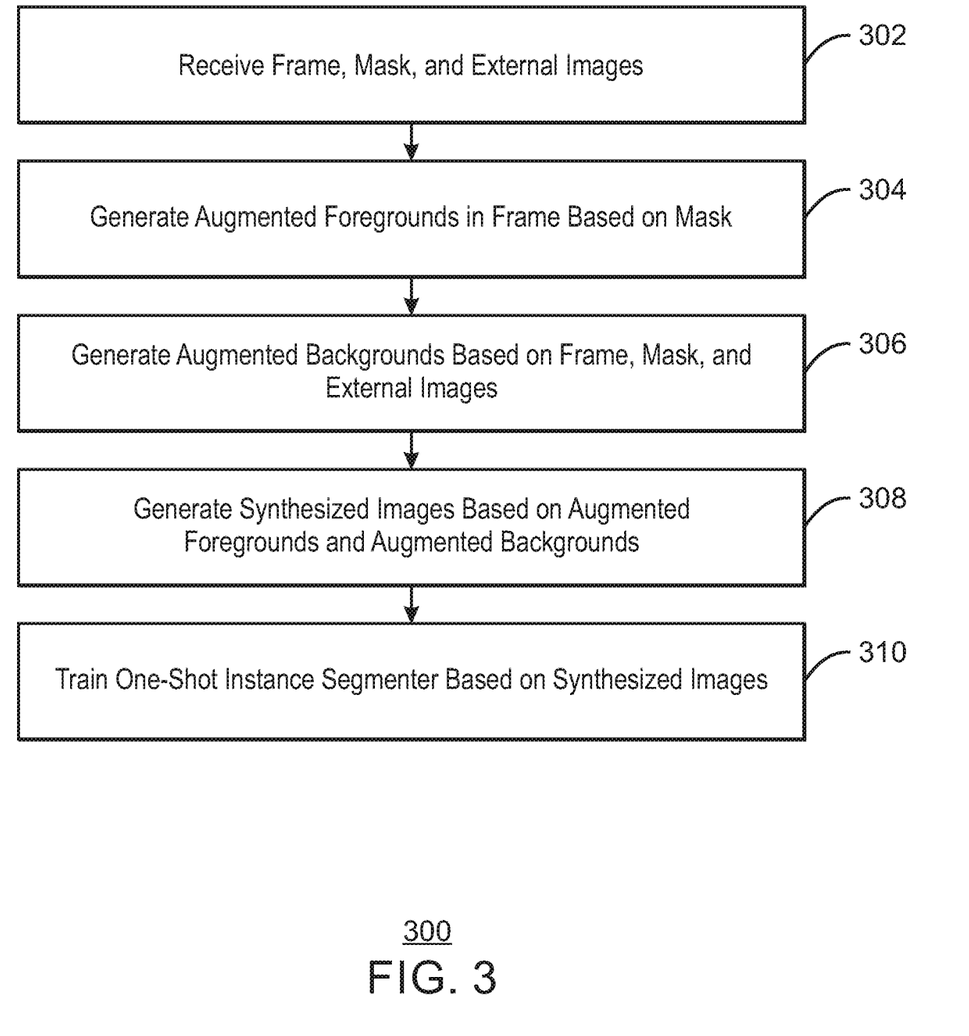
FIG. 3 is a flow chart illustrating a method for training a one-shot instance segmenter using synthesized images.

FIG. 3 is a flow chart illustrating a method for training a one-shot instance segmenter using synthesized images. The example method is generally referred to by the reference number 300 and can be implemented in the system 100 of FIG. 1 above, the processor 602 of the computing device 600 of FIG. 6 below, or the computer readable media 700 of FIG. 7 below.

At block 302, a processor receives a frame, a mask, and external images. For example, the frame may be a first frame of a video and the mask may indicate one or more foregrounds in the frame. The external images may be received from an external database of images.

At block 304, the processor generates augmented foregrounds in the frame based on the mask. For example, the processor can apply rigid transformations and non-rigid transformations to each annotated foreground of the frame to generate a predetermined number of foreground diversifications.

At block 306, the processor generates augmented backgrounds based on the frame, the mask, and the external images. In some examples, the processor can generating a first frame background based on the frame and the mask by removing and inpainting a masked portion of the frame. For example, the processor can generate a first frame background based on the frame and the mask, as described in FIG. 4 below. In some examples, the processor can select a predetermined number of images from the external images based on a correlation of color and semantics of the external images to a first frame background extracted from the frame. The processor can generate a color and semantic-correlated background based on a subset of the external images selected based on a correlation score calculated for each of the external images. In some examples, the correlation score can be based on a color histogram correlation score, a foreground semantic correlation score, and a background purity score. For example, the semantic correlation score can be generated using a sNet as described above. The processor can also send, to a semantic segmentation network trained on an external database, the frame and external images and receive semantic maps to be used to calculate a foreground semantic correlation score. For example, the sNet may be used to calculate the semantic correlation score as describe in FIG. 2 above. The processor can thus generate a predetermined number of CSB images to add to the augmented backgrounds. For example, a small number of CSB images may be enough to synthesize additional training sets. As one example, 25 CSB images may be generated and added to the set of augmented backgrounds. The processor can then remove foregrounds in the same semantic category as the detected object from a set of selected external images and fill in the removed foreground using inpainting.

At block 308, the processor generates synthesized images based on the augmented foregrounds and the augmented backgrounds. The processor can combine an augmented foreground with an augmented background. For example, the processor can combine each of the augmented foregrounds with each of the augmented backgrounds using Poisson matting to smooth gradients between foregrounds and backgrounds. For example, the processor can solve Poisson equations with the matte gradient field smooth the gradients. The generated synthesized images may thus have a variety of different poses for each foreground instance with various backgrounds.

At block 310, the processor trains a one-shot instance segmenter based on the synthesized images. In some examples, the processor can train the one-shot instance segmenter using 2000 iterations of training to increase the preciseness of the trained one-shot instance segmenter. Moreover, the variety of the augmented foregrounds corresponding to a particular foreground instance and various augmented backgrounds may improve the ability of the one-shot instance segmenter to detect the foreground in various poses and against various possible backgrounds.

This process flow diagram is not intended to indicate that the blocks of the example process 300 are to be executed in any particular order, or that all of the blocks are to be included in every case. Further, any number of additional blocks not shown may be included within the example process 300, depending on the details of the specific implementation.

Figure 4:
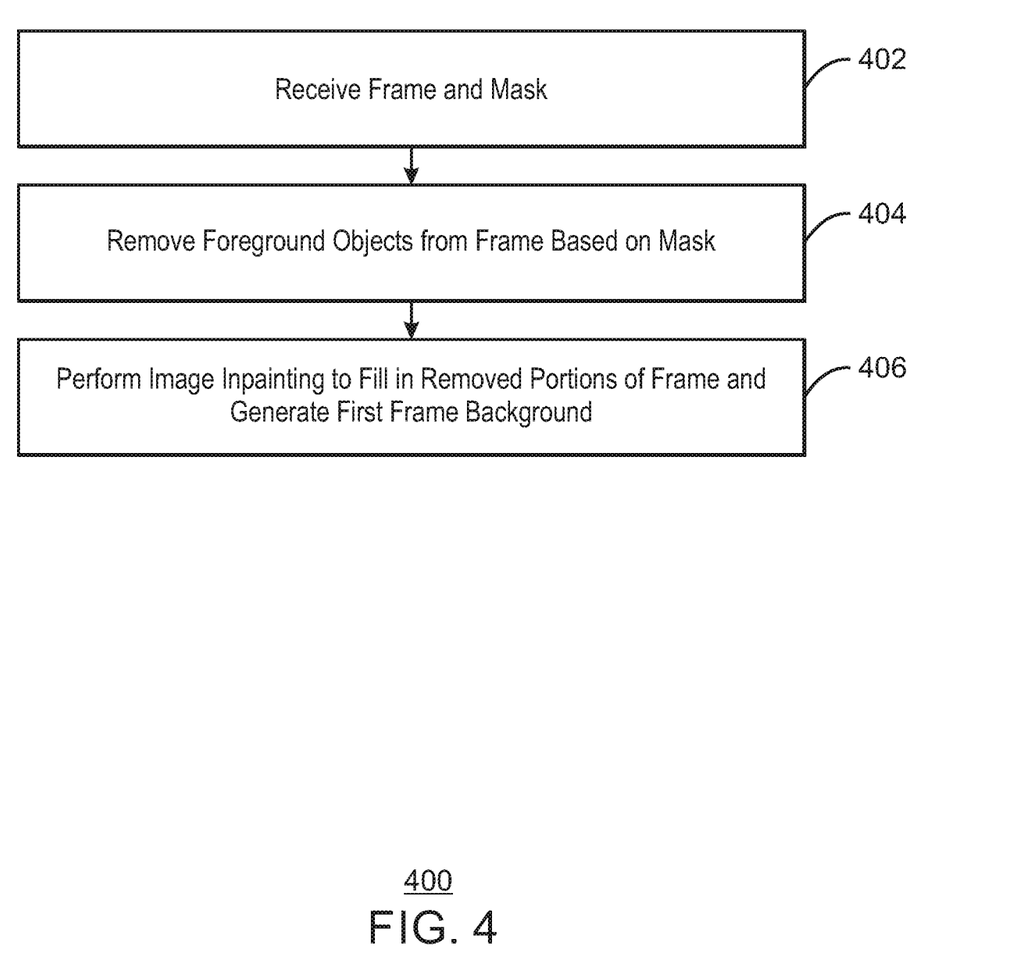
FIG. 4 is a flow chart illustrating a method for generating first frame backgrounds.

FIG. 4 is a flow chart illustrating a method for generating first frame backgrounds. The example method is generally referred to by the reference number 400 and can be implemented in the system 200 of FIG. 2 above, the method 300 of FIG. 3 above, the processor 602 of the computing device 600 of FIG. 6 below, or the computer readable media 700 of FIG. 7 below.

At block 402, a processor receives a frame and a mask. For example, the frame may be a first frame of a video and the mask may indicate one or more foregrounds in the frame. In some examples, the mask may include background pixels set to one predetermined value such as zero, and foreground pixels set to another value such as one. In some example, the one or more foregrounds in the mask may be annotated. For example, each instance of a foreground may be labeled according to an object that the foreground represents. An instance, as used herein, refers to a particular foreground to be detected. Thus, as one example, one instance of a foreground may be a person while another instance of a foreground may be a dog. As another example, in a frame with three people, each person is a foreground instance. In some examples, each instance may be assigned a different value for tracking. For example, a first person may be assigned the value 1, while a dog may be assigned the value 2, and a second person may be assigned the value 3, etc.

At block 404, the processor removes foreground objects from the frame based on the mask. For example, the foregrounds may be removed from the frame leaving a removed portion in place of the foreground.

At block 406, the processor performs image inpainting to fill in removed portions of the frame and generate a first frame background. For example, image inpainting can include to automatically filling in removed regions with information surrounding the removed portions. The image inpainting process can start at the region boundary to fill the nearby pixels. The image inpainting process can then iteratively estimate the pixels near boundary until all pixels are filled. The generated first frame background may be an augmented background that is used to synthesize training images as described in FIG. 3 above.

This process flow diagram is not intended to indicate that the blocks of the example process 400 are to be executed in any particular order, or that all of the blocks are to be included in every case. Further, any number of additional blocks not shown may be included within the example process 400, depending on the details of the specific implementation.

Figure 5:
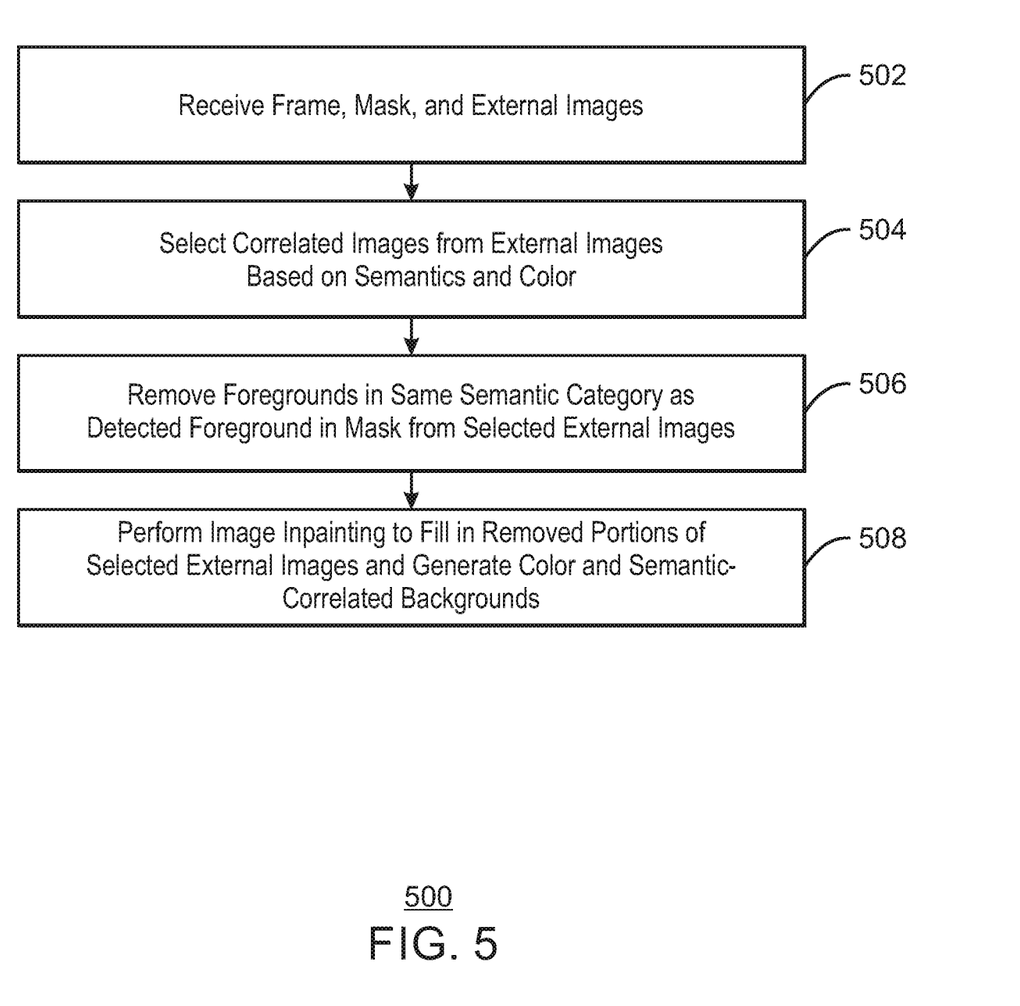
FIG. 5 is a flow chart illustrating a method for generating color and semantic-corrected images.

FIG. 5 is a flow chart illustrating a method for generating color and semantic-corrected images. The example method is generally referred to by the reference number 500 and can be implemented in the systems 100 and 200 of FIGS. 1 and 2 above, the processor 602 of the computing device 600 of FIG. 6 below, or the computer readable media 700 of FIG. 7 below.

At block 502, a processor receives a frame, a mask, and external images. For example, the frame may be a first frame of a video and the mask may indicate one or more foregrounds in the frame. The external images may be received from an external database of images.

At block 504, the processor selects correlated images from the external images based on semantics and color. In some examples, the processor can select a predetermined number of images from the external images based on a correlation score. For example, the correlation score can be calculated as described with respect to Eq. 1 of FIG. 2 above.

At block 506, the processor removes foregrounds in a same semantic category as a foreground in the mask from the selected external images. For example, the processor may detect that a foreground instance in the mask is a cat and remove cats from the selected external images.

At block 508, the processor performs image inpainting to fill in removed portions of the selected external images and generates color and semantic-correlated backgrounds (CSBs). The generated first frame background may be an augmented background that is used to synthesize training images as described in FIG. 3 above.

This process flow diagram is not intended to indicate that the blocks of the example process 500 are to be executed in any particular order, or that all of the blocks are to be included in every case. Further, any number of additional blocks not shown may be included within the example process 500, depending on the details of the specific implementation.

Figure 6:
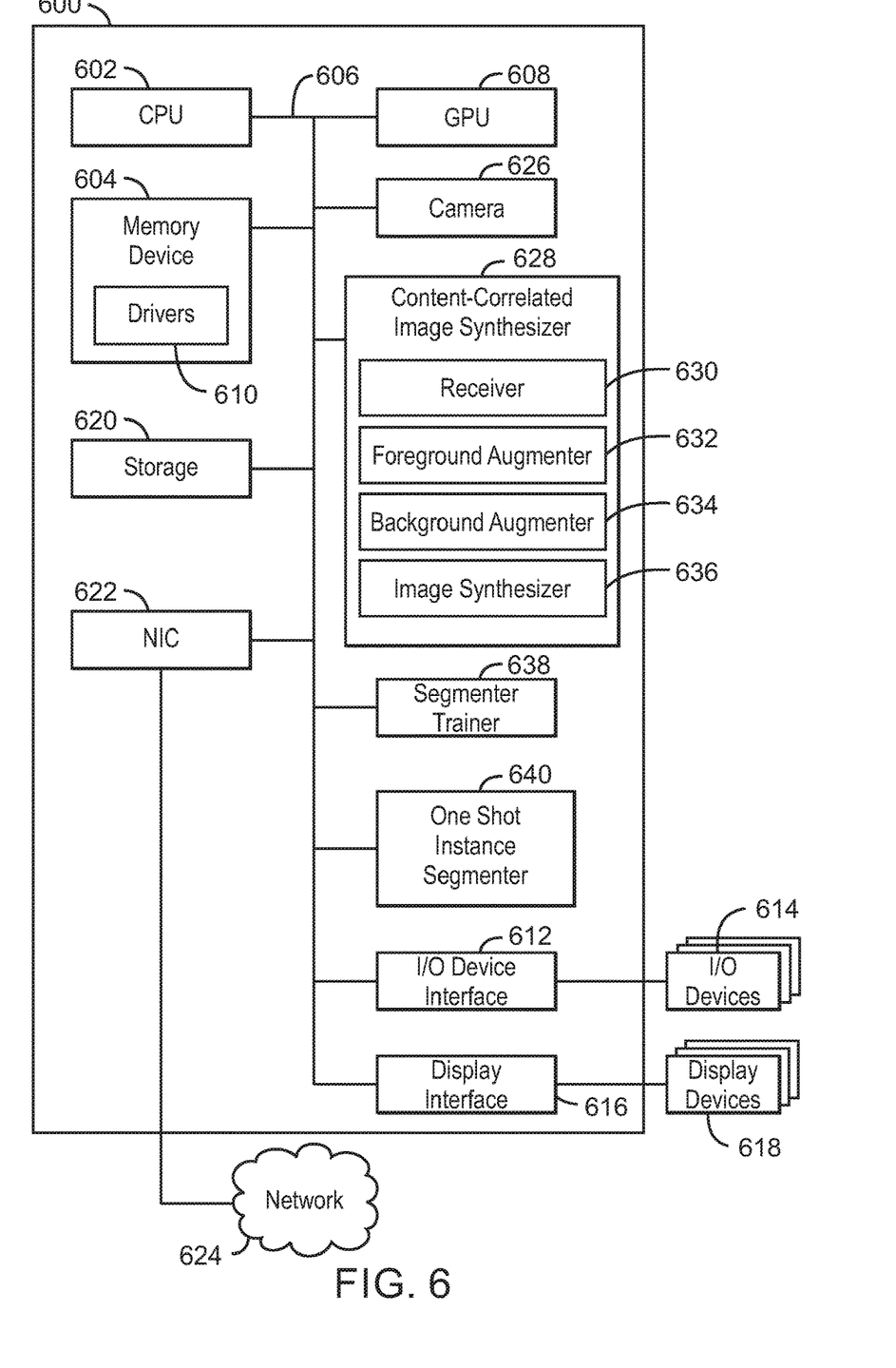
FIG. 6 is block diagram illustrating an example computing device that can synthesize images to train a one-shot image synthesizer train a one.

Referring now to FIG. 6, a block diagram is shown illustrating an example computing device that can synthesize images to train a one-shot image synthesizer. The computing device 600 may be, for example, a laptop computer, desktop computer, tablet computer, mobile device, or wearable device, among others. In some examples, the computing device 600 may be a self-driving vehicle or a robot. The computing device 600 may include a central processing unit (CPU) 602 that is configured to execute stored instructions, as well as a memory device 604 that stores instructions that are executable by the CPU 602. The CPU 602 may be coupled to the memory device 604 by a bus 606. Additionally, the CPU 602 can be a single core processor, a multi-core processor, a computing cluster, or any number of other configurations. Furthermore, the computing device 600 may include more than one CPU 602. In some examples, the CPU 602 may be a system-on-chip (SoC) with a multi-core processor architecture. In some examples, the CPU 602 can be a specialized digital signal processor (DSP) used for image processing. The memory device 604 can include random access memory (RAM), read only memory (ROM), flash memory, or any other suitable memory systems. For example, the memory device 604 may include dynamic random access memory (DRAM).

The memory device 604 can include random access memory (RAM), read only memory (ROM), flash memory, or any other suitable memory systems. For example, the memory device 604 may include dynamic random access memory (DRAM).

The computing device 600 may also include a graphics processing unit (GPU) 608. As shown, the CPU 602 may be coupled through the bus 606 to the GPU 608. The GPU 608 may be configured to perform any number of graphics operations within the computing device 600. For example, the GPU 608 may be configured to render or manipulate graphics images, graphics frames, videos, or the like, to be displayed to a user of the computing device 600.

The memory device 604 can include random access memory (RAM), read only memory (ROM), flash memory, or any other suitable memory systems. For example, the memory device 604 may include dynamic random access memory (DRAM). The memory device 604 may include device drivers 610 that are configured to execute the instructions for generating synthesized images for training a one-shot instance segmenter. For example, the synthesized images may include a variety of augmented foregrounds corresponding to a foreground from a received mask, against various backgrounds. The device drivers 610 may be software, an application program, application code, or the like.

The CPU 602 may also be connected through the bus 606 to an input/output (I/O) device interface 612 configured to connect the computing device 600 to one or more I/O devices 614. The I/O devices 614 may include, for example, a keyboard and a pointing device, wherein the pointing device may include a touchpad or a touchscreen, among others. The I/O devices 614 may be built-in components of the computing device 600, or may be devices that are externally connected to the computing device 600. In some examples, the memory 604 may be communicatively coupled to I/O devices 614 through direct memory access (DMA).

The CPU 602 may also be linked through the bus 606 to a display interface 616 configured to connect the computing device 600 to a display device 618. The display device 618 may include a display screen that is a built-in component of the computing device 600. The display device 618 may also include a computer monitor, television, or projector, among others, that is internal to or externally connected to the computing device 600.

The computing device 600 also includes a storage device 620. The storage device 620 is a physical memory such as a hard drive, an optical drive, a thumbdrive, an array of drives, a solid-state drive, or any combinations thereof. The storage device 620 may also include remote storage drives.

The computing device 600 may also include a network interface controller (NIC) 622. The NIC 622 may be configured to connect the computing device 600 through the bus 606 to a network 624. The network 624 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 600 further includes a camera 626. For example, the camera may include one or more imaging sensors. In some example, the camera may include a processor to generate frames. For example, the frames may be color RGB frames.

The computing device 600 further includes a content-correlated image synthesizer 628. For example, the content-correlated image synthesizer 628 can be used to generate synthesized images to be used for training one-shot instance segmenters. The content-correlated image synthesizer 628 can include a receiver 630, a foreground augmenter 632, a background augmenter 634, and an image synthesizer 636. In some examples, each of the components 630-634 of the content-correlated image synthesizer 628 may be a microcontroller, embedded processor, or software module. The receiver 630 can receive a frame, a mask and external images. In some examples, the external images may be received from an external database of images. The foreground augmenter 632 can generate augmented foregrounds in the frame based on the mask. For example, the augmented foregrounds can include foreground diversifications including rigid body diversifications and non-rigid body diversifications. The background augmenter 634 can generate augmented backgrounds based on the frame, the mask, and the external images. For example, the background augmenter 634 can generate a first frame background based on the frame and the mask by removing and inpainting a masked portion of the frame. In some examples, the background augmenter 634 can select a predetermined number of images from the external images based on a correlation of color and semantics of the external images to a first frame background extracted from the frame. For example, the background augmenter 634 can generate a color and semantic-correlated background based on a selected subset of the external images selected based on a correlation score calculated for each of the external images. The correlation score may be based on a color histogram correlation score, a foreground semantic correlation score, and a background purity score. In some examples, the background augmenter 634 can remove foregrounds in the same semantic category as the detected object from a set of selected external images and fill in the removed foreground using inpainting. The image synthesizer 636 can generate a synthesized image based on the augmented foregrounds and the augmented backgrounds. In some examples, the image synthesizer 636 can generate a predetermined number of synthesized images based on the number of selected external images. For example, the image synthesizer 636 can generate a synthesized image by combining an augmented foreground with an augmented background. In some examples, the image synthesizer 636 can combine each of the augmented foregrounds with each of the augmented backgrounds using Poisson matting to smooth gradients between foregrounds and backgrounds.

The system 100 further includes a segmenter trainer 638 to train a one-shot instance segmenter 640 based on the synthesized image. For example, the segmenter trainer 638 may perform offline training to train a general segmentation model. The segmenter trainer 638 can then perform online training to fine tune the classifier of the one-shot instance segmenter 640 based on the synthesized images generated by the content-correlated image synthesizer 628.

The block diagram of FIG. 6 is not intended to indicate that the computing device 600 is to include all of the components shown in FIG. 6. Rather, the computing device 600 can include fewer or additional components not illustrated in FIG. 6, such as additional buffers, additional processors, and the like. The computing device 600 may include any number of additional components not shown in FIG. 6, depending on the details of the specific implementation. Furthermore, any of the functionalities of the receiver 630, the foreground augmenter 632, the background augmenter 634, the image synthesizer 636, the segmenter trainer 638, and the one-shot instance segmenter 640, may be partially, or entirely, implemented in hardware and/or in the processor 602. For example, the functionality may be implemented with an application specific integrated circuit, in logic implemented in the processor 602, or in any other device. In addition, any of the functionalities of the CPU 602 may be partially, or entirely, implemented in hardware and/or in a processor. For example, the functionality of the content-correlated image synthesizer 628 may be implemented with an application specific integrated circuit, in logic implemented in a processor, in logic implemented in a specialized graphics processing unit such as the GPU 608, or in any other device.

Figure 7:
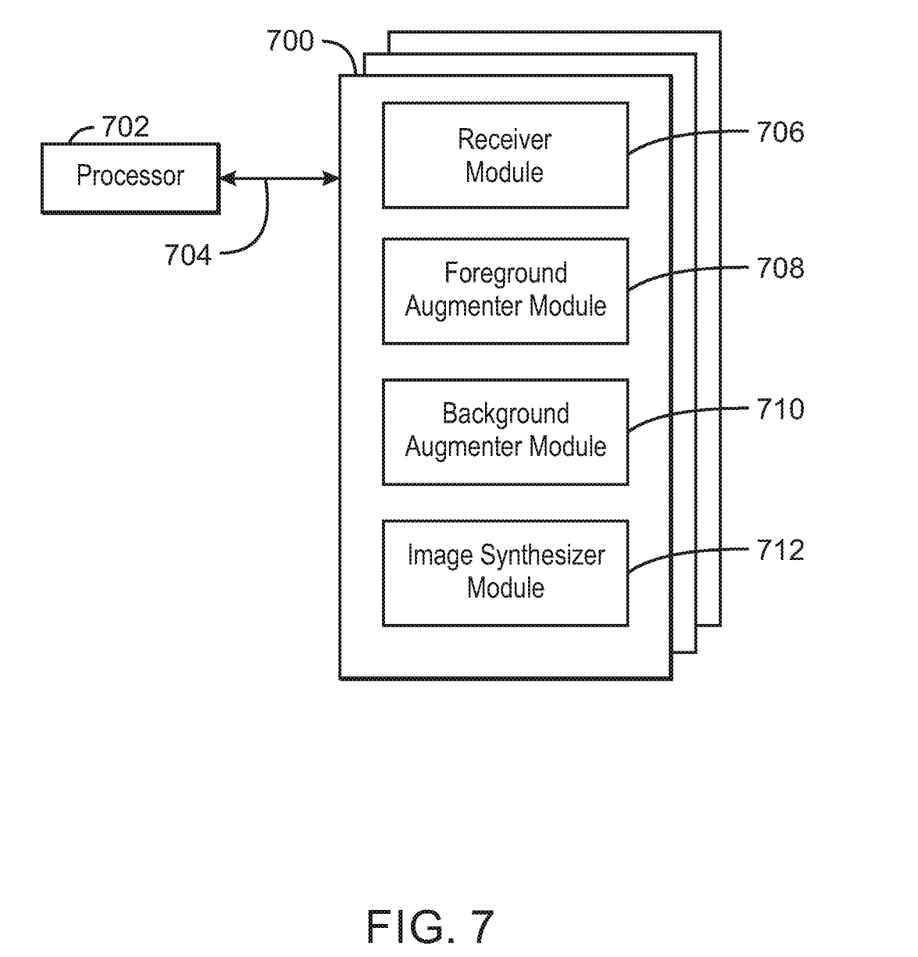
FIG. 7 is a block diagram showing computer readable media that store code for synthesizing images for training a one-shot instance segmenter.

FIG. 7 is a block diagram showing computer readable media 700 that store code for synthesizing images for training a one-shot instance segmenter. The computer readable media 700 may be accessed by a processor 702 over a computer bus 704. Furthermore, the computer readable medium 700 may include code configured to direct the processor 702 to perform the methods described herein. In some embodiments, the computer readable media 700 may be non-transitory computer readable media. In some examples, the computer readable media 700 may be storage media.

The various software components discussed herein may be stored on one or more computer readable media 700, as indicated in FIG. 7. For example, a receiver module 706 may be configured to receive a frame, a mask and external images. A foreground augmenter module 708 may be configured to generate augmented foregrounds in the frame based on the mask. In some examples, the foreground augmenter module 708 may be configured to apply rigid transformations and non-rigid transformations to each annotated foreground of the frame to generate a predetermined number of foreground diversifications. A background augmenter module 710 may be configured to generate augmented backgrounds based on the frame, the mask, and the external images. For example, the background augmenter 710 may be configured to generate a first frame background based on the frame and the mask by removing and inpainting a masked portion of the frame. The background augmenter module 710 may be configured to generate a color and semantic-correlated background based on a subset of the external images selected based on a correlation score calculated for each of the external images. For example, the correlation score may be based on a color histogram correlation score, a foreground semantic correlation score, and a background purity score. In some examples, the background augmenter module 710 may be configured to select a predetermined number of images from the external images based on a correlation of color and semantics of the external images to a first frame background extracted from the frame. In some examples, the background augmenter module 710 may be configured to remove foregrounds in the same semantic category as the detected object from a set of selected external images and fill in the removed foreground using inpainting. In some examples, the background augmenter module 710 may be configured to generate semantic maps to be used to calculate a foreground semantic correlation score. For example, each semantic map may be generated based on the frame and an image in an external database. An image synthesizer module 712 may be configured to generate a synthesized image based on the augmented foregrounds and the augmented backgrounds. For example, the image synthesizer module 712 may be configured to generate the synthesized image by combining an augmented foreground with an augmented background. In some examples, the image synthesizer module 712 may be configured to combine each of the augmented foregrounds with each of the augmented backgrounds using Poisson matting to smooth gradients between foregrounds and backgrounds.

The block diagram of FIG. 7 is not intended to indicate that the computer readable media 700 is to include all of the components shown in FIG. 7. Further, the computer readable media 700 may include any number of additional components not shown in FIG. 7, depending on the details of the specific implementation. For example, the computer readable media 700 may include a segmenter trainer module (not shown) to train a one-shot instance segmenter based on the synthesized image.

EXAMPLES

Example 1 is an apparatus for generating synthesized images. The apparatus includes a receiver to receive a frame, a mask and external images. The apparatus also includes a foreground augmenter to generate augmented foregrounds in the frame based on the mask. The apparatus further includes a background augmenter to generate augmented backgrounds based on the frame, the mask, and the external images. The apparatus also further includes an image synthesizer to generate a synthesized image based on the augmented foregrounds and the augmented backgrounds.

Example 2 includes the apparatus of example 1, including or excluding optional features. In this example, the apparatus includes a segmenter trainer to train a one-shot instance segmenter based on the synthesized image.

Example 3 includes the apparatus of any one of examples 1 to 2, including or excluding optional features. In this example, the augmented foregrounds include foreground diversifications including rigid body diversifications and non-rigid body diversifications.

Example 4 includes the apparatus of any one of examples 1 to 3, including or excluding optional features. In this example, the background augmenter is to generate a first frame background based on the frame and the mask by removing and inpainting a masked portion of the frame.

Example 5 includes the apparatus of any one of examples 1 to 4, including or excluding optional features. In this example, the background augmenter is to select a predetermined number of images from the external images based on a correlation of color and semantics of the external images to a first frame background extracted from the frame.

Example 6 includes the apparatus of any one of examples 1 to 5, including or excluding optional features. In this example, the background augmenter is to generate a color and semantic-correlated background based on a selected subset of the external images selected based on a correlation score calculated for each of the external images, wherein the correlation score is based on a color histogram correlation score, a foreground semantic correlation score, and a background purity score.

Example 7 includes the apparatus of any one of examples 1 to 6, including or excluding optional features. In this example, the background augmenter is to remove foregrounds in the same semantic category as the detected object from a set of selected external images and fill in the removed foreground using inpainting.

Example 8 includes the apparatus of any one of examples 1 to 7, including or excluding optional features. In this example, the background augmenter includes a semantic segmentation network trained on an external database, the semantic segmentation network to receive the frame and external images and output semantic maps to be used to calculate a foreground semantic correlation score.

Example 9 includes the apparatus of any one of examples 1 to 8, including or excluding optional features. In this example, the image synthesizer is to generate the synthesized image by combining an augmented foreground with an augmented background.

Example 10 includes the apparatus of any one of examples 1 to 9, including or excluding optional features. In this example, the image synthesizer is to combine each of the augmented foregrounds with each of the augmented backgrounds using Poisson matting to smooth gradients between foregrounds and backgrounds.

Example 11 is a method for generating synthesized images. The method includes receiving, via a processor, a frame, a mask and external images. The method also includes generating, via the processor, augmented foregrounds in the frame based on the mask. The method further includes generating, via the processor, augmented backgrounds based on the frame, the mask, and the external images. The method also further includes generating, via the processor, a synthesized image based on the augmented foregrounds and the augmented backgrounds.

Example 12 includes the method of example 11, including or excluding optional features. In this example, the method includes training, via the processor, a one-shot instance segmenter based on the synthesized image.

Example 13 includes the method of any one of examples 11 to 12, including or excluding optional features. In this example, generating the augmented foregrounds includes applying rigid transformations and non-rigid transformations to each annotated foreground of the frame to generate a predetermined number of foreground diversifications.

Example 14 includes the method of any one of examples 11 to 13, including or excluding optional features. In this example, generating the augmented backgrounds includes generating a first frame background based on the frame and the mask by removing and inpainting a masked portion of the frame.

Example 15 includes the method of any one of examples 11 to 14, including or excluding optional features. In this example, generating the augmented backgrounds includes selecting a predetermined number of images from the external images based on a correlation of color and semantics of the external images to a first frame background extracted from the frame.

Example 16 includes the method of any one of examples 11 to 15, including or excluding optional features. In this example, generating the augmented backgrounds includes removing foregrounds in the same semantic category as the detected object from a set of selected external images and fill in the removed foreground using inpainting.

Example 17 includes the method of any one of examples 11 to 16, including or excluding optional features. In this example, generating the augmented backgrounds includes generating a color and semantic-correlated background based on a subset of the external images selected based on a correlation score calculated for each of the external images, wherein the correlation score is based on a color histogram correlation score, a foreground semantic correlation score, and a background purity score.

Example 18 includes the method of any one of examples 11 to 17, including or excluding optional features. In this example, generating the synthesized image includes combining an augmented foreground with an augmented background.

Example 19 includes the method of any one of examples 11 to 18, including or excluding optional features. In this example, generating the synthesized image includes combining each of the augmented foregrounds with each of the augmented backgrounds using Poisson matting to smooth gradients between foregrounds and backgrounds.

Example 20 includes the method of any one of examples 11 to 19, including or excluding optional features. In this example, generating the augmented backgrounds includes receiving, at a semantic segmentation network trained on an external database, the frame and external images and outputting semantic maps to be used to calculate a foreground semantic correlation score.

Example 21 is at least one computer readable medium for generating synthesized images having instructions stored therein that. The computer-readable medium includes instructions that direct the processor to receive a frame, a mask and external images. The computer-readable medium also includes instructions that direct the processor to generate augmented foregrounds in the frame based on the mask. The computer-readable medium further includes instructions that direct the processor to generate augmented backgrounds based on the frame, the mask, and the external images. The computer-readable medium also further includes instructions that direct the processor to generate a synthesized image based on the augmented foregrounds and the augmented backgrounds.

Example 22 includes the computer-readable medium of example 21, including or excluding optional features. In this example, the computer-readable medium includes instructions to train a one-shot instance segmenter based on the synthesized image.

Example 23 includes the computer-readable medium of any one of examples 21 to 22, including or excluding optional features. In this example, the computer-readable medium includes instructions to apply rigid transformations and non-rigid transformations to each annotated foreground of the frame to generate a predetermined number of foreground diversifications.

Example 24 includes the computer-readable medium of any one of examples 21 to 23, including or excluding optional features. In this example, the computer-readable medium includes instructions to generate a first frame background based on the frame and the mask by removing and inpainting a masked portion of the frame.

Example 25 includes the computer-readable medium of any one of examples 21 to 24, including or excluding optional features. In this example, the computer-readable medium includes instructions to select a predetermined number of images from the external images based on a correlation of color and semantics of the external images to a first frame background extracted from the frame.

Example 26 includes the computer-readable medium of any one of examples 21 to 25, including or excluding optional features. In this example, the computer-readable medium includes instructions to remove foregrounds in the same semantic category as the detected object from a set of selected external images and fill in the removed foreground using inpainting.

Example 27 includes the computer-readable medium of any one of examples 21 to 26, including or excluding optional features. In this example, the computer-readable medium includes instructions to generate a color and semantic-correlated background based on a subset of the external images selected based on a correlation score calculated for each of the external images.

Example 28 includes the computer-readable medium of any one of examples 21 to 27, including or excluding optional features. In this example, the computer-readable medium includes instructions to combine an augmented foreground with an augmented background.

Example 29 includes the computer-readable medium of any one of examples 21 to 28, including or excluding optional features. In this example, the computer-readable medium includes instructions to combine each of the augmented foregrounds with each of the augmented backgrounds using Poisson matting to smooth gradients between foregrounds and backgrounds.

Example 30 includes the computer-readable medium of any one of examples 21 to 29, including or excluding optional features. In this example, the computer-readable medium includes instructions to process the illuminated image using high dynamic resolution (HDR) tone mapping.

Example 31 is a system for generating synthesized images. The system includes a receiver to receive a frame, a mask and external images. The system also includes a foreground augmenter to generate augmented foregrounds in the frame based on the mask. The system further includes a background augmenter to generate augmented backgrounds based on the frame, the mask, and the external images. The system also further includes an image synthesizer to generate a synthesized image based on the augmented foregrounds and the augmented backgrounds.

Example 32 includes the system of example 31, including or excluding optional features. In this example, the system includes a segmenter trainer to train a one-shot instance segmenter based on the synthesized image.

Example 33 includes the system of any one of examples 31 to 32, including or excluding optional features. In this example, the augmented foregrounds include foreground diversifications including rigid body diversifications and non-rigid body diversifications.

Example 34 includes the system of any one of examples 31 to 33, including or excluding optional features. In this example, the background augmenter is to generate a first frame background based on the frame and the mask by removing and inpainting a masked portion of the frame.

Example 35 includes the system of any one of examples 31 to 34, including or excluding optional features. In this example, the background augmenter is to select a predetermined number of images from the external images based on a correlation of color and semantics of the external images to a first frame background extracted from the frame.

Example 36 includes the system of any one of examples 31 to 35, including or excluding optional features. In this example, the background augmenter is to generate a color and semantic-correlated background based on a selected subset of the external images selected based on a correlation score calculated for each of the external images, wherein the correlation score is based on a color histogram correlation score, a foreground semantic correlation score, and a background purity score.

Example 37 includes the system of any one of examples 31 to 36, including or excluding optional features. In this example, the background augmenter is to remove foregrounds in the same semantic category as the detected object from a set of selected external images and fill in the removed foreground using inpainting.

Example 38 includes the system of any one of examples 31 to 37, including or excluding optional features. In this example, the background augmenter includes a semantic segmentation network trained on an external database, the semantic segmentation network to receive the frame and external images and output semantic maps to be used to calculate a foreground semantic correlation score.

Example 39 includes the system of any one of examples 31 to 38, including or excluding optional features. In this example, the image synthesizer is to generate the synthesized image by combining an augmented foreground with an augmented background.

Example 40 includes the system of any one of examples 31 to 39, including or excluding optional features. In this example, the image synthesizer is to combine each of the augmented foregrounds with each of the augmented backgrounds using Poisson matting to smooth gradients between foregrounds and backgrounds.

Example 41 is a system for generating synthesized images. The system includes means for receiving a frame, a mask and external images. The system also includes means for generating augmented foregrounds in the frame based on the mask. The system further includes means for generating augmented backgrounds based on the frame, the mask, and the external images. The system also further includes means for generating a synthesized image based on the augmented foregrounds and the augmented backgrounds.

Example 42 includes the system of example 41, including or excluding optional features. In this example, the system includes means for training a one-shot instance segmenter based on the synthesized image.

Example 43 includes the system of any one of examples 41 to 42, including or excluding optional features. In this example, the augmented foregrounds include foreground diversifications including rigid body diversifications and non-rigid body diversifications.

Example 44 includes the system of any one of examples 41 to 43, including or excluding optional features. In this example, the means for generating the augmented backgrounds is to generate a first frame background based on the frame and the mask by removing and inpainting a masked portion of the frame.

Example 45 includes the system of any one of examples 41 to 44, including or excluding optional features. In this example, the means for generating the augmented backgrounds is to select a predetermined number of images from the external images based on a correlation of color and semantics of the external images to a first frame background extracted from the frame.

Example 46 includes the system of any one of examples 41 to 45, including or excluding optional features. In this example, the means for generating the augmented backgrounds is to generate a color and semantic-correlated background based on a selected subset of the external images selected based on a correlation score calculated for each of the external images, wherein the correlation score is based on a color histogram correlation score, a foreground semantic correlation score, and a background purity score.

Example 47 includes the system of any one of examples 41 to 46, including or excluding optional features. In this example, the means for generating the augmented backgrounds is to remove foregrounds in the same semantic category as the detected object from a set of selected external images and fill in the removed foreground using inpainting.

Example 48 includes the system of any one of examples 41 to 47, including or excluding optional features. In this example, the means for generating the augmented backgrounds includes a semantic segmentation network trained on an external database, the semantic segmentation network to receive the frame and external images and output semantic maps to be used to calculate a foreground semantic correlation score.

Example 49 includes the system of any one of examples 41 to 48, including or excluding optional features. In this example, the means for generating the synthesized image is to generate the synthesized image by combining an augmented foreground with an augmented background.

Example 50 includes the system of any one of examples 41 to 49, including or excluding optional features. In this example, the means for generating the synthesized image is to combine each of the augmented foregrounds with each of the augmented backgrounds using Poisson matting to smooth gradients between foregrounds and backgrounds.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus comprising:
    interface circuitry;
    instructions; and
    processor circuitry to execute the instructions to:
        generate augmented foregrounds based on a foreground object in a frame and based on a mask;
        generate augmented backgrounds based on the frame, the mask, and separate images, the augmented backgrounds including a first frame background generated by removing and inpainting a masked portion of the frame; and
        generate synthesized images based on the augmented foregrounds and the augmented backgrounds, a first plurality of the synthesized images based on the first frame background, a second plurality of the synthesized images based on color and semantic-correlated backgrounds generated based on ones of the separate images.

2. The apparatus of claim 1, wherein the processor circuitry is to train a one-shot instance segmentation model based on the synthesized images.

3. The apparatus of claim 1, wherein the augmented foregrounds include foreground diversifications including rigid body diversifications and non-rigid body diversifications.

4. The apparatus of claim 3, wherein one of the non-rigid body diversifications is associated with a two-dimensional thin-plate spline.

5. The apparatus of claim 1, wherein the processor circuitry is to select a number of images from the separate images based on a correlation of color and semantics of the separate images to the first frame background.

6. The apparatus of claim 1, wherein the processor circuitry is to generate the color and semantic-correlated backgrounds based on a subset of the separate images, the subset selected based on correlation scores calculated for respective ones of the separate images, the correlation scores based on a color histogram correlation score, a foreground semantic correlation score, and a background purity score.

7. The apparatus of claim 1, wherein the processor circuitry is to remove foregrounds in a same semantic category as a detected object from selected ones of the separate images and fill in the removed foregrounds using inpainting.

8. The apparatus of claim 1, wherein the processor circuitry is to implement a semantic segmentation network trained on an external database, the semantic segmentation network to use the frame and the separate images as inputs, the semantic segmentation network to output semantic maps to be used to calculate foreground semantic correlation scores for respective ones of the separate images.

9. The apparatus of claim 8, wherein the semantic maps define different values for respective ones of different pixels in the frame and the separate images, the different values indicative of different semantic labels associated with the respective ones of the different pixels.

10. The apparatus of claim 1, wherein the processor circuitry is to generate the synthesized images by combining ones of the augmented foregrounds with ones of the augmented backgrounds.

11. The apparatus of claim 1, wherein the processor circuitry is to combine respective ones of the augmented foregrounds with respective ones of the augmented backgrounds using Poisson matting to smooth gradients between foregrounds and backgrounds.

12. The apparatus of claim 1, wherein respective ones of the synthesized images in the second plurality of the synthesized images are based on different ones of the separate images.

13. A method comprising:
    generating, via processor circuitry, augmented foregrounds based on a foreground object in a frame and based on a mask;
    generating, via the processor circuitry, augmented backgrounds based on the frame, the mask, and separate images, the augmented backgrounds including a first frame background generated by removing and inpainting a masked portion of the frame; and
    generating, via the processor circuitry, synthesized images based on the augmented foregrounds and the augmented backgrounds, a first plurality of the synthesized images based on the first frame background, a second plurality of the synthesized images based on color and semantic-correlated backgrounds generated based on ones of the separate images.

14. The method of claim 12, further including training, via the processor circuitry, a one-shot instance segmentation model based on the synthesized images.

15. The method of claim 12, wherein the generating of the augmented foregrounds includes applying rigid transformations and non-rigid transformations to an annotated foreground of the frame to generate a number of foreground diversifications.

16. The method of claim 12, wherein the generating of the augmented backgrounds includes selecting a number of images from the separate images based on a correlation of color and semantics of the separate images to the first frame background.

17. The method of claim 12, wherein the generating of the augmented backgrounds includes removing foregrounds in a same semantic category as a detected object from a set of selected ones of the separate images and fill in the removed foregrounds using inpainting.

18. The method of claim 12, wherein the generating of the augmented backgrounds includes generating the color and semantic-correlated backgrounds based on a subset of the separate images selected based on correlation scores calculated for respective ones of the separate images, the correlation scores based on a color histogram correlation score, a foreground semantic correlation score, and a background purity score.

19. The method of claim 12, wherein the generating of the synthesized images includes combining ones of the augmented foregrounds with ones of the augmented backgrounds.

20. The method of claim 12, wherein the generating of the synthesized images includes combining respective ones of the augmented foregrounds with respective ones of the augmented backgrounds using Poisson matting to smooth gradients between foregrounds and backgrounds.

21. The method of claim 12, wherein the generating of the augmented backgrounds includes providing the frame and the separate images as inputs to a semantic segmentation network implemented by the processor circuitry, the semantic segmentation network trained on an external database, the semantic segmentation network outputting semantic maps to be used to calculate foreground semantic correlation scores for respective ones of the separate images.

22. At least one storage device comprising instructions that cause processor circuitry to at least:

generate augmented foregrounds based on a foreground object in a frame and based on a mask;

generate augmented backgrounds based on the frame, the mask, and separate images, the augmented backgrounds including a first frame background generated by removing and inpainting a masked portion of the frame; and generate synthesized images based on the augmented foregrounds and the augmented backgrounds, a first plurality of the synthesized images based on the first frame background, a second plurality of the synthesized images based on color and semantic-correlated backgrounds generated based on ones of the separate images.

23. The at least one storage device of claim 22, wherein the instructions cause the processor circuitry to train a one-shot instance segmentation model based on the synthesized images.

24. The at least one storage device of claim 22, wherein the augmented foregrounds include foreground diversifications including rigid body diversifications and non-rigid body diversifications.

25. The at least one storage device of claim 22, wherein the instructions further cause the processor circuitry to select a number of images from the separate images based on a correlation of color and semantics of the separate images to the first frame background.

* * * * *